United States Patent [19]

McAlister

[11] Patent Number: 5,469,888
[45] Date of Patent: Nov. 28, 1995

[54] CONTROL VALVE

[75] Inventor: Graeme J. McAlister, Belgrave, Australia

[73] Assignee: Sapico Establishment, Vaduz, Liechtenstein

[21] Appl. No.: 338,822

[22] Filed: Nov. 10, 1994

Related U.S. Application Data

[63] Continuation of Ser. No. 70,406, filed as PCT/AU91/00578, Dec. 12, 1990, abandoned.

[30] Foreign Application Priority Data

Dec. 12, 1990 [AU] Australia .................................. PK3868

[51] Int. Cl.⁶ ........................................................ F15B 13/06
[52] U.S. Cl. .................. 137/625.17; 91/536; 137/625.68
[58] Field of Search ............................ 91/536; 137/625.17, 137/625.68

[56] References Cited

U.S. PATENT DOCUMENTS

| | | | |
|---|---|---|---|
| 2,471,289 | 5/1949 | Sedgwick . | |
| 2,911,006 | 11/1959 | Vogel | 137/625.17 |
| 3,215,160 | 11/1965 | Rice | 137/625.68 X |
| 3,269,412 | 8/1966 | Badke | 137/625.17 |
| 3,602,243 | 8/1971 | Holt et al. | 91/446 X |
| 4,080,982 | 3/1978 | Maezawa | 137/625.3 X |
| 4,324,274 | 4/1982 | Golan et al. | 137/625.69 X |
| 4,337,796 | 7/1982 | Bonney | 137/625.17 |
| 4,355,659 | 10/1982 | Kelchner . | |
| 4,388,949 | 6/1983 | Bonney | 137/625.17 |
| 4,434,966 | 3/1984 | Zajac | 137/625.69 X |

FOREIGN PATENT DOCUMENTS

| | | | |
|---|---|---|---|
| 258794 | 4/1970 | U.S.S.R. | 137/625.17 |
| 1406926 | 9/1973 | United Kingdom . | |
| WO82/01403 | 4/1982 | WIPO . | |

Primary Examiner—Gerald A. Michalsky

[57] ABSTRACT

A manual control valve is provided for operating at least two end users such as double acting actuating cylinders or the like either individually or simultaneously. The valve including a valve body, a distribution spool housed within the valve body and which is capable of rotation or axial displacement within the valve body by external manipulation. The valve body being connectable through an inlet to a source of pressurized fluid and through an outlet to a reservoir for exhausted fluid. At least two delivery passages spaced axially and radially on the valve body are provided for delivery of pressurized fluid to end users. The spool having distribution passages for directing pressurized fluid individually from the inlet selectability to one or the other of said delivery passages or in a second rotational position, simultaneously to both said delivery passages.

22 Claims, 7 Drawing Sheets

CONTROL VALVE

This application is a continuation of application Ser. No. 08/070,406 filed as PCT/AU91/00578, Dec. 12, 1990, now abandoned.

BACKGROUND OF THE INVENTION

The present invention relates to hydraulic control valves, in particular, for the manual control of hydraulic power machines such as double acting cylinders, reversible hydraulic motors and the like. The invention being particularly aimed at providing a single control valve which will enable the operation of more than one such hydraulic machine alternately or multiples of said hydraulic machinery selectably at a similar time. The invention will hereinafter be described in relation to the control valve being adapted to control hydraulic lift cylinders, however, it will be readily apparent that the invention is also applicable to controlling any other hydraulically powered machine.

Conventionally, hydraulic speed and directional control valves have been designed as singular operative units such that they control one hydraulic cylinder, or simultaneously additional hydraulic cylinders. Such control valves have generally been not capable of selectively operating separate hydraulic cylinders, or selectably one or more but not all of the hydraulic cylinders simultaneously.

To overcome this shortcoming, several means have been used in the prior art. These include "stacking" of valves or by using cross-over linkages, and/or specific operator levers and linkage connections. When used in multiple connections there are several disagreeable factors involved such as, excessive horsepower needed for operation, extreme linkage wear, and poor control over two or more lift cylinder operations. Such arrangements may suffer from difficulties in controlling the amount of oil distributed into the separate lift cylinders thus adversely affecting the speed at which the hydraulic lift cylinders operate in a loaded or unloaded movement, moreover the cost of supplying and installing these conventional type arrangements can be quite high and they require significant space for correct installation on machinery where such space is often difficult to find. The arrangement can themselves be quite heavy which is not an advantage. In addition such arrangements can cause restrictions in the flow of hydraulic fluid and as a result they may cause overheating with consequent poor efficiency of operation. It is therefore considered desirable from a number of factors to be able to replace these existing complex valve and linkage arrangements with a single control valve which is simple to operate and which enables the desired control of hydraulic lift cylinders or the like connected thereto.

SUMMARY OF THE INVENTION

The objective of the present invention is therefore to provide a manually operable control valve for hydraulic machines such as lift cylinders which will overcome or minimise the difficulties described in the foregoing with conventional prior art arrangements.

According to the present invention, there is provided a manual control valve for controlling flow of pressurised fluid to and from at least two users of said pressurised fluid, said valve comprising a valve body, said valve body having at least two pressurised fluid delivery means each being adapted for connection to a pressurised fluid supply, a distribution spool located within said valve body being both rotatable therein by manipulation of the distribution spool by an operator external to the valve body, said distribution spool including passage means adapted in selected rotational positions to direct pressurised fluid from said pressurised fluid supply to each of said pressurised fluid delivery means individually and in at least one further rotational position to direct pressurised fluid simultaneously to at least two of said pressurised fluid delivery means.

Conveniently, the spool passage means communicates with port openings in the spool at an interface between said valve body and said spool, said port openings being substantially square or rectangular.

According to a further aspect of the present invention, there is provided a manually actuated control valve for controlling flow of pressurised fluid to and from at least two users of said pressurised fluid, said control valve comprising a valve body, housing a distribution spool, having a longitudinal axis, and mounted in said valve body in a manner permitting selective axial and rotational movement of the spool relative to the valve body by manual manipulation of the spool by an operator external to the valve body. Fluid inlet passage provided in said valve body for connection to a source of said pressurised fluid and said valve body further having a pressurised fluid outlet, four fluid inlet means in said spool arranged in longitudinally spaced diametrically opposed pairs to receive pressurised fluid from the valve body inlet passage when said spool is selectably positioned axially so to do. Each said pair of inlet means being arranged to direct fluid to at least four spool outlet means located around said spool, each of said spool outlet means being adapted to direct fluid to at least one delivery means leading through said valve body when said spool inlet and outlet means are arranged in a predetermined axial and rotational position. Conveniently, each said spool outlet means, in a selected rotational spool position, is adapted to connect at least two of said delivery means leading through the valve body.

Conveniently, exhaust fluid outlet means is provided in the valve body adapted to drain fluid from the valve body exhausted from the users of the pressurised fluid.

Preferably the valve construction is configured such that two of said spool outlet means are selectably connected to transfer ports associated with said pairs of fluid delivery means leading through the valve body by relative axial movement of the spool in selected rotational positions of said spool. At the same time, other of said spool outlet means are connected to the exhaust fluid outlet means.

It is particularly preferred that all spool outlet ports and inlet ports be either substantially square or rectangular in shape, and/or be retained within a cross-sectional square or rectangular area.

BRIEF DESCRIPTION OF THE DRAWINGS

The present invention will hereinafter be described with reference to a preferred embodiment illustrated in the accompanying drawings. In the drawings.

DESCRIPTION OF THE PREFERRED EMBODIMENT

Figure 1:
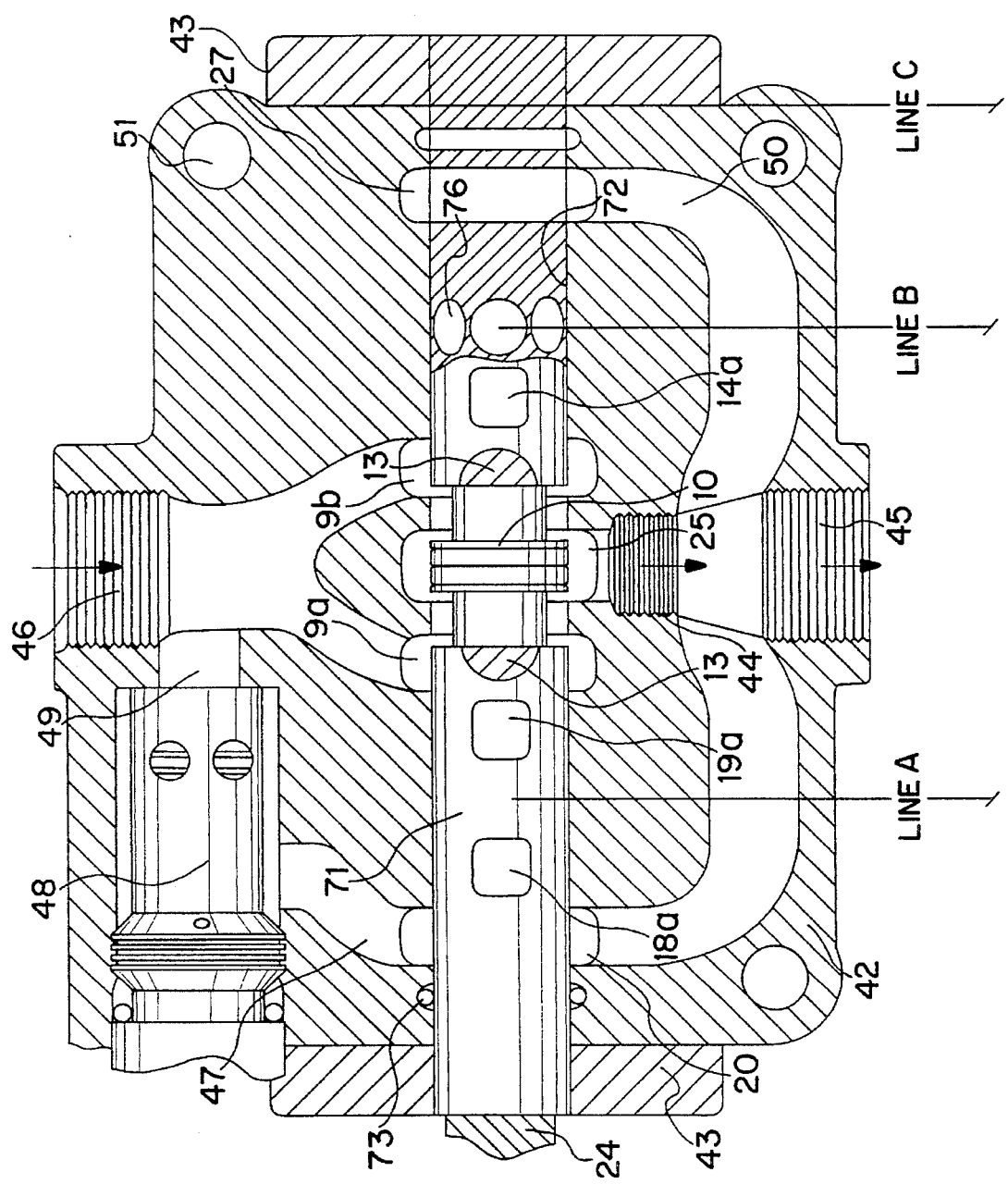
FIG. 1 is a longitudinal sectional view taken along line B of FIG. 7 through the valve construction with spool in a neutral position, the spool being cut-away for the purposes of clarity.

Referring first to FIG. 1 of the drawings, the valve illustrated comprises a valve body 42 with a high pressure fluid supply inlet 46 adapted to receive high pressure fluid from a suitable supply source. The body 42 also has a fluid discharge outlet 45 adapted, when appropriately connected, to return fluid to a suitable reservoir. A distribution spool 71 is provided in a central bore 72 extending through the body 42 and is mounted to enable rotational movement within the bore and axial movement along the longitudinal axis of the bore by external operator manipulation. Both ends of the valve construction are sealed by appropriate seal means such as "O" rings 73. One end of the spool 24 protrudes through the valve body 42 for optional hand controls shown in FIGS. 9 and 10 enabling external operator manipulation. The hand controls shown in FIGS. 9 and 10 and valve explanation shown in FIGS. 1 to 8 are described hereinafter.

The valve body includes a plurality of pressure fluid delivery connections suitably arranged around its outer surface, each of which communicate through the valve body 42 to the central bore 72 via passage means. In the illustrated embodiment there are provided pairs of pressure fluid delivery connections 1/2, 3/4, 5/6 and offset pressure portals 30/31, 32/33 and 34/35 in matching pairs adapted to deliver and receive hydraulic fluid from either end of double acting hydraulic cylinders or the like.

Referring first to FIG. 1, the valve construction is shown with the valve spool 71 in a part cut away view, in a neutral operation position. In this position, hydraulic fluid supplied under pressure from a suitable source (such as a pump) to a fluid inlet connection 46 passes through the valve construction to fluid outlet connection 45 thereby enabling return of the fluid to a suitable reservoir. The inlet connection 46, with the valve in the neutral position, directs the fluid to a pair of HP chambers 9a and 9b, that extend both axially along the surface and around the circumference of the distribution spool 71 and longitudinally adjacent to one another on either side of a circumferential land 10 formed on the spool 71. Four circumferentially spaced control vents 13 are positioned around the spool surface 71 leading into the respective chambers 9a and 9b at the ends thereof distant from the land 10. The control vents 13 enable progressive flow control into and from chambers 9a and 9b.

The land 10, in the illustrated neutral position, is centrally located within the low pressure (LP) chamber 25 located in the valve body 42 opening onto the bore 72 and positioned centrally between the channels 9a and 9b. The central LP chamber 25 leads fluid to a closed centre portal 44, and closed centre outlet 11 (not shown) then outward to LP manifold 50 and the outlet connection 45. As a result, pressurised fluid entering the valve body 42 at inlet connection 46 passes via chambers 9a and 9b and 25 to the portal 44, manifold 50 and the outlet connection 45. Thus in the neutral position, no pressurised fluid is delivered to any end user such as lift cylinders or the like.

Figure 2:
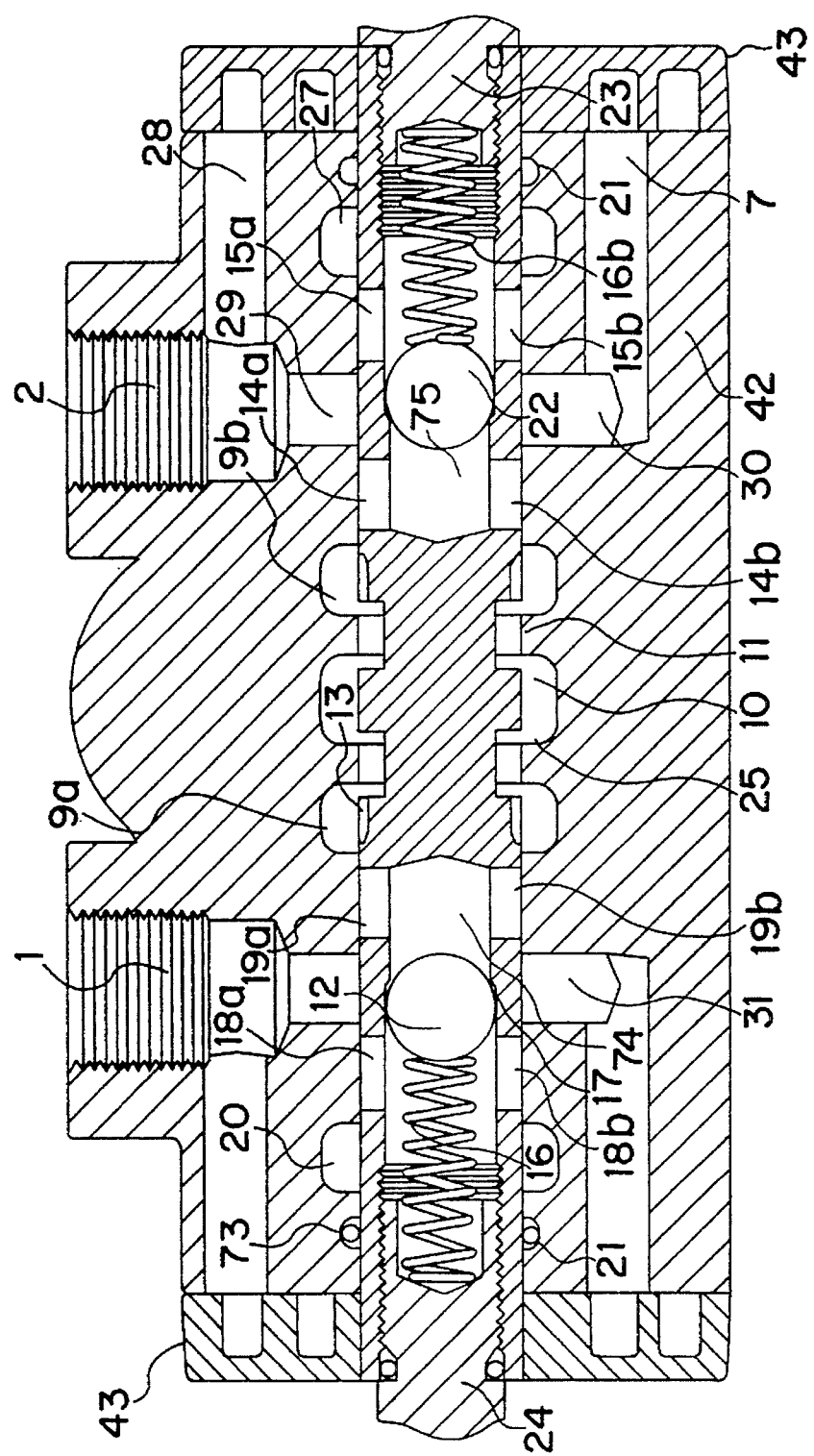
FIG. 2 is a longitudinal sectional view similar to FIG. 1 but taken along the line A of FIG. 7 with the valve spool again in a neutral position.

FIG. 2 also represents the valve construction in a neutral position but is a section view taken on an opposite plane to that of FIG. 1. FIG. 2 illustrates a group of four substantially square or rectangular passages 19a and 19b and 14a and 14b extending radially into the spool 71 from its outer surface. The two passages 19a and 19b being diametrically opposed relative to one another and located on one side of the central chamber 9a lead to a blind internal bore 74 and the two passages 14a and 14b lead to a second internal blind bore 75 within the spool 71 but the bore 75 extends to the opposite end of the spool 71 to that of bore 74. In the bore 74, a non-return ball valve seat 17 is provided. The ball valve 12 permits pressurised fluid flow outwardly along the bore 74 from the passageways 9a and 9b but not in a reverse direction. Similarly, in the bore 75, a non-return valve 22 is provided spring-loaded inwardly by a second spring 16b. Again the valve 22 permits pressurised fluid flow outwardly along the bore 75 from the passageways 14a and 14b but not in the reverse direction.

In the spool 71, outwardly beyond the non-return valve 12, there is provided two passages 18a and 18b leading radially from the bore 74 to an outer surface of the spool 71. Similarly, from the circumferentially spaced passages 15a and 15b lead radially from the bore 75 outwardly of the non-return valve 22 to an outer surface of the spool 71. The passages 18a and 18b and 19a and 19b and 14a and 14b and 15a and 15b are conveniently substantially square or rectangular when viewed circumferentially and are restricted to a positive square area on the spool's outer surface. Whilst in the neutral position (FIGS. 1 and 2), the passages 18a—to— 15b are sealed from leakage against solid wall sections of the central bore 72.

Figure 5:
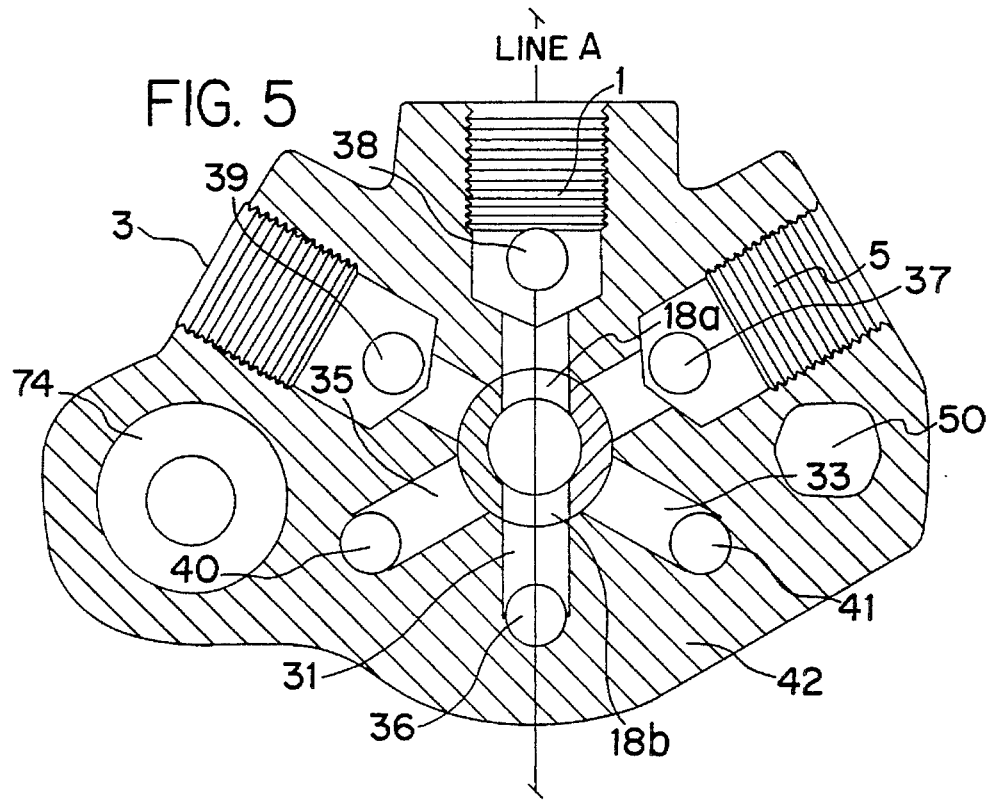
FIG. 5 is a transverse sectional view along line A of FIG. 1 with the spool in an operative position on user 1, refer alternative view FIGS. 2 or 4.
Figure 6:
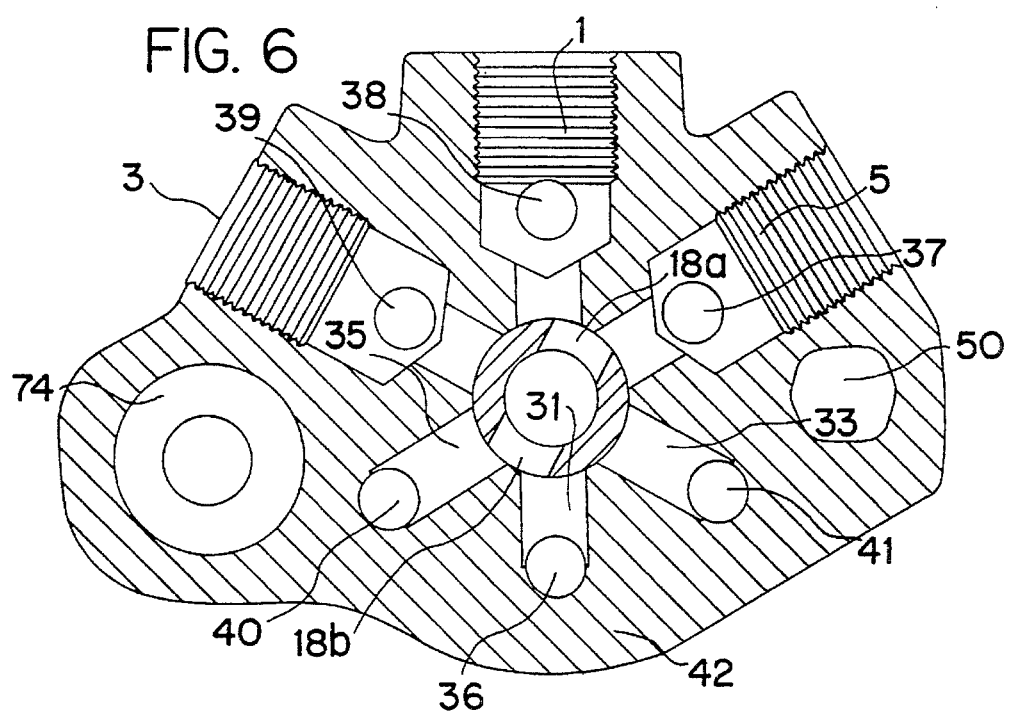
FIG. 6 is a transverse sectional view along line A of FIG. 1 with the spool in an axial operative position part on user 1 and part on user 5.
Figure 7:
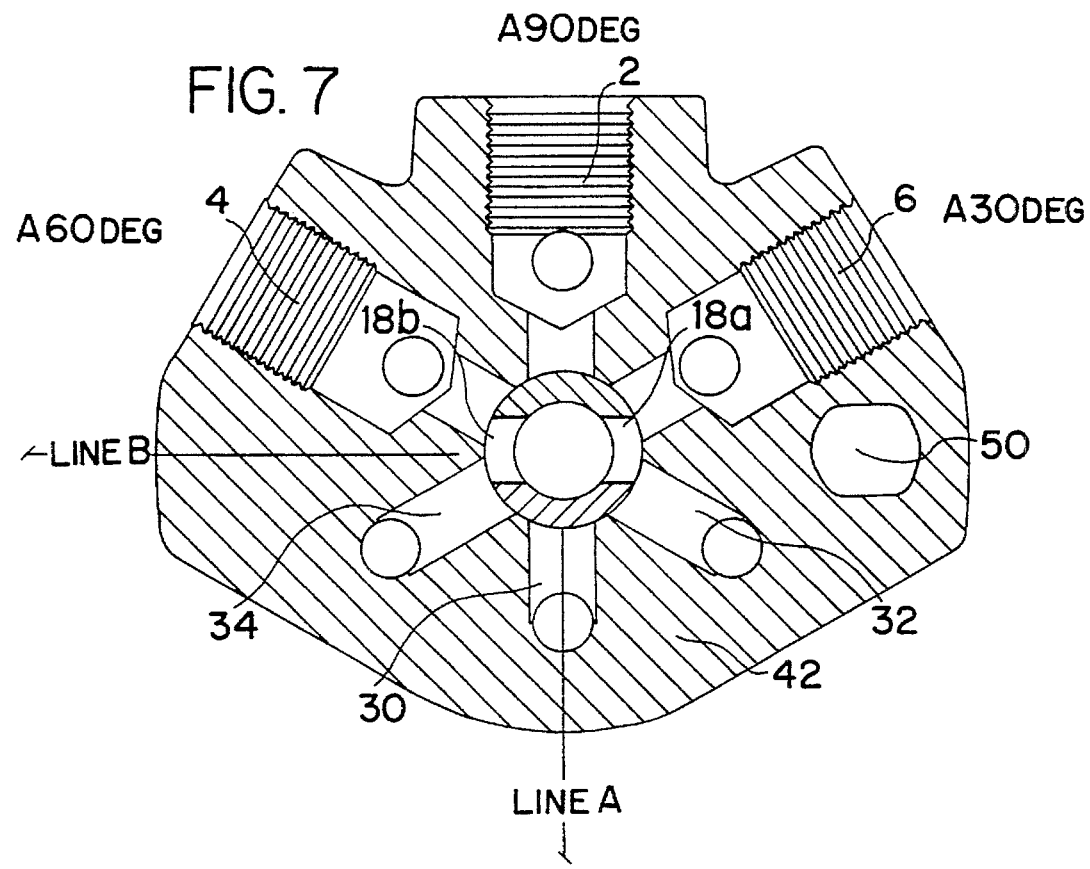
FIG. 7 is a transfer sectional view along line B of FIG. 1 with the spool shown rotated axially and held in an operative position, part on user 4 and part on user 6.
Figure 8:
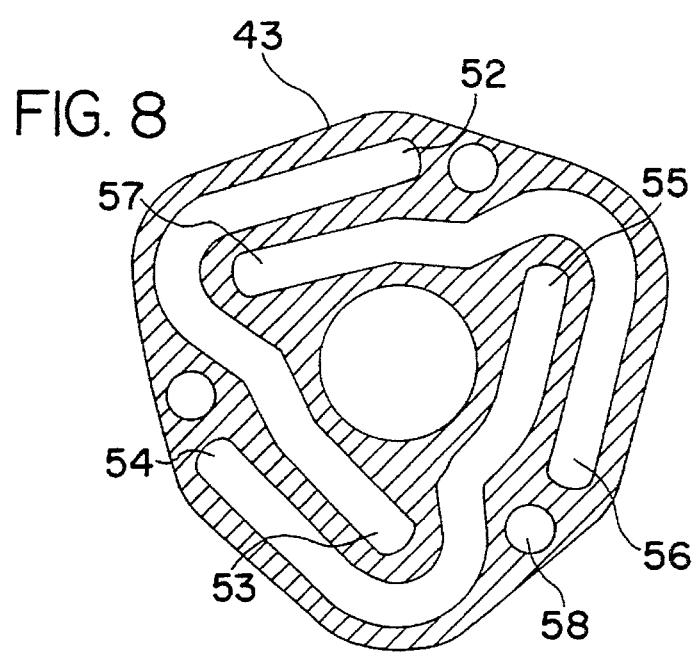
FIG. 8 is a transverse view taken along line C of FIG. 1 showing pressure channels within the face of a distribution manifold.

Arranged between each of the passages 14a and 14b and 15a and 15b, are situated a series of user delivery vents 76 and offset porting vents 76 as illustrated in cut away view of shaft (FIG. 1) showing vents 76 within valve cylinder (refer also FIGS. 5, 6 and 7), in FIGS. 5 and 6, the user delivery vents are 1, 3 and 5 and in FIG. 7, the user delivery vents are 2, 4 and 6. The remaining connections 31, 33 and 35 (in FIGS. 5 and 6) and 30, 32 and 34 (in FIG. 7) being offset porting vents designed to balance pressure on effective spool surface area and cut out "hydraulic lock". In each case an offset perting vent is diametrically opposed to one of the user delivery vents. These vents are preferably shaped, at least at the point of exit and/or entry, in a round cross-section area so as to allow the selection of more than one pair of users and offset porting vents with a progressive control.

The user vents and the offset porting vents are connected via passageways (refer FIGS. 5 and 6) to a transfer manifold 43 (refer FIG. 8) channel 52 to 53 connecting passageways 38 and 36. Correspondingly channel 57 to 56 and 52 to 54 connecting 37 to 40 and 39 to 41. Accordingly FIG. 7 passageways also being connected by a similar manifold 43.

Figure 3:
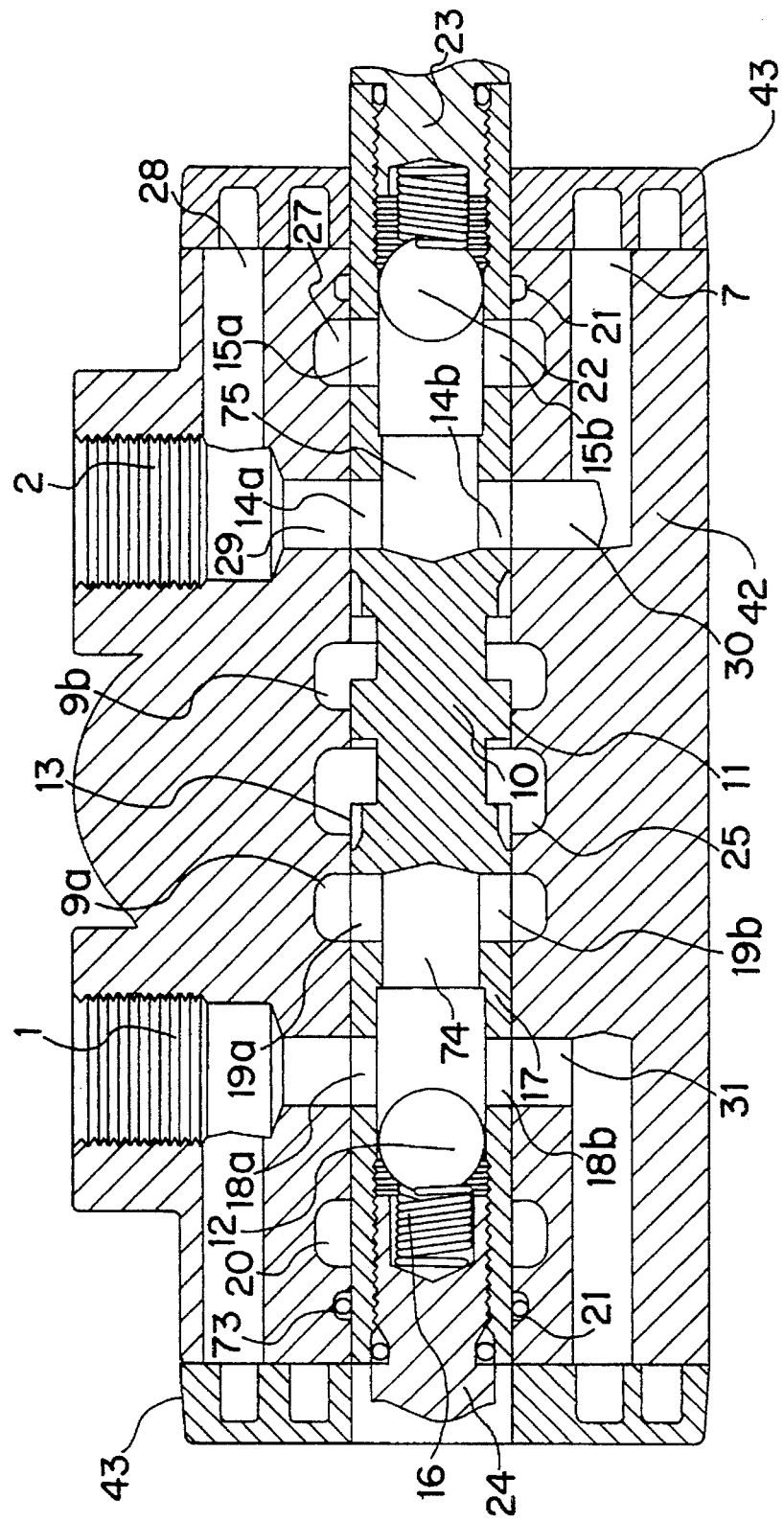
FIGS. 3 and 4 are longitudinal sectional views similar to FIG. 2 but showing the valve construction with the valve spool in two separate operational positions.

Now, with the spool 71 in the neutral position as shown in FIG. 2, and if the spool is moved axially to the right as shown in FIG. 3, the open faces of passages 18a and 18b are brought into line with the delivery vent 1 and the offset porting vent 31.

At the same time, passages 19a and 19b also move into a position to connect with the HP manifold 9a fed with pressurised fluid from inlet 46 (refer FIG. 1). Simultaneously, the passages 14a and 14b move to connect user vent 2 and offset vent 30 whilst passages 15a and 15b connect the bore 75 to the LP manifold 27. Control vents and the control lands or bridge 10 progressively close at a similar time to seal the LP chamber 25 by co-operation with land 11, of the cylinder bore 72. In this configuration, passages 18a and 18b and 19a and 19b become Hp passages, and passages 14a and 14b and 15a and 15b become LP passages.

Figure 4:
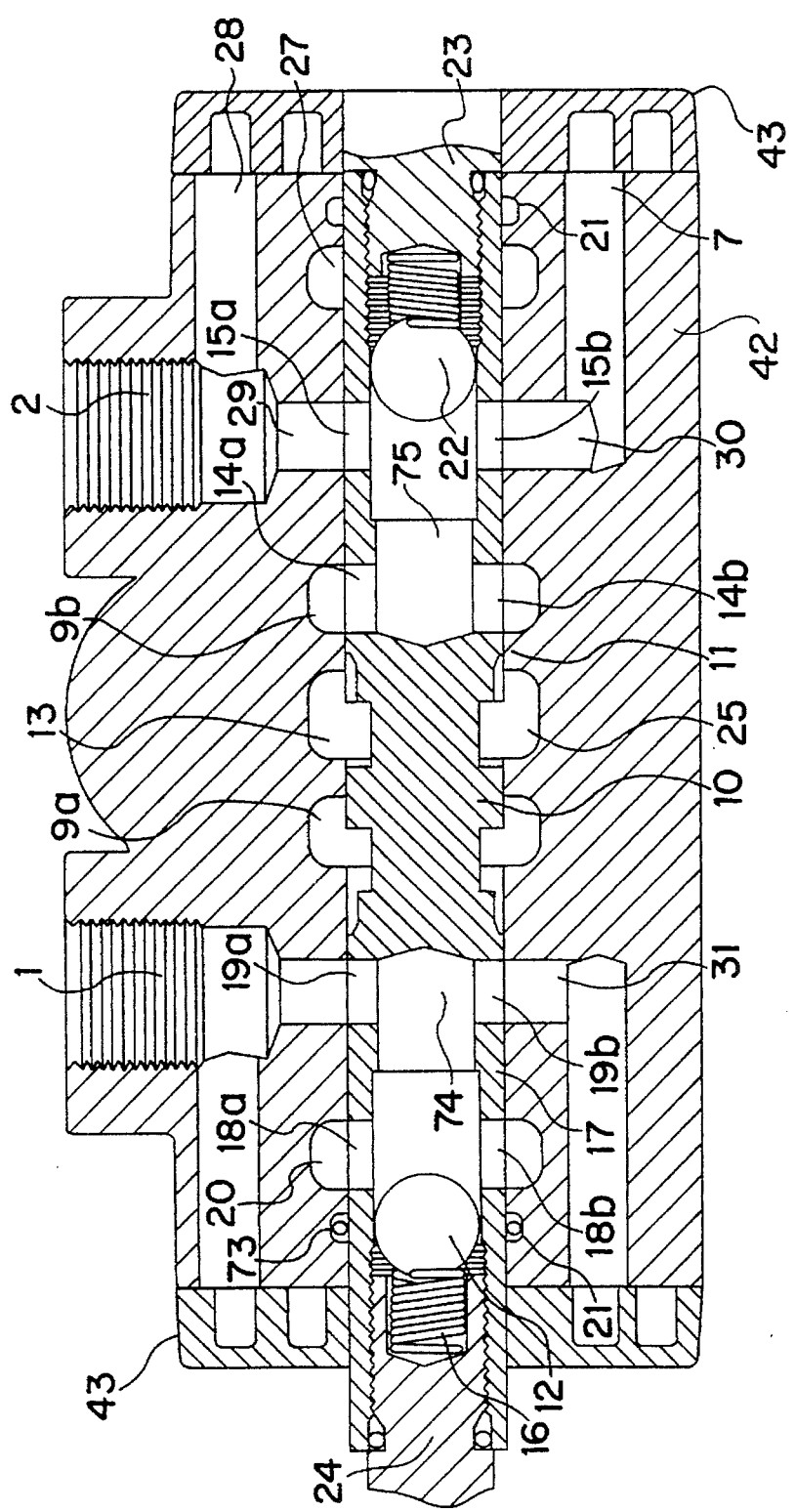

If the spool 71 is moved to the left as shown in FIG. 4, the chambers 25 and 9b are progressively closed by the spool surface in relation to the cylinder bore. Passages 18a and 18b and 19a and 19b thereby become LP passages (refer FIGS. 2 and 4). This action in turn redirects oil through passages 14a and 14b by forcing non-return valve 22 from its seat into an open position within passage 75. Thus pressurised fluid is allowed to flow in that direction through HP outlets 15a and 15b. As a result, with the spool as shown in FIG. 3, pressurised fluid is supplied to one end of a hydraulic lift cylinder (or the like) via a selected port and offset port 1 and 31 respectively from the inlet supply 46 (refer FIG. 1). As the same fluid is exhausted to the low pressure manifold 27 from the opposite end of the lift cylinder via passages 14a and 14b connecting port 2 and offset port 30 (FIG. 3) by forcing non-return valve 22 from its seat to an open position. This exhausted fluid may return through bore 75 and passages 15a and 15b to the LP manifold 27. It will then be appreciated that movement of the spool to the right or left as described previously would provide a progressive connection to the inlet 46, thereby providing a control over the rate of pressurised fluid flow and the rate of actuation of a lift cylinder connected thereto. The non-return valves 12 and 22 situated within cylinder spool 71, prevent high pressure feed-back during this stage operation. The larger black arrows in the drawings denoting oil flow direction.

FIGS. 9a, 9b, 9c and 10 of the accompanying drawings illustrate an appropriate mechanism for permitting an operator to move the distribution spool 71 both axially and rotationally as desired.

An operating lever 59 mounted within a rotatable member 63 by a pin 67 and in turn held within a body 61 and retained by a pin 64. One end of the operating lever 59 being for manual control, the other end slidably mounted within member 63 over pin 67. The rotatable member 63 is retained in the body 61 and is further slidably connected by a pin and boss 66 to member 69. Member 69 is connected to spool 71. In this manner by pivoting the lever 59 and member 61 about the pivot point 64, member 63 will be moved axially thereby causing movement of the spool 71 in an axial direction within the main bore 72. In addition, the operating lever 59 may also be rotated about axis 80 which also causes pin 66 to rotate about the axis of spool 71 thereby resulting in angular movement of the spool to desired positions. The ball 65 is adopted to positively engage in circumferential locations (recesses) upon rotation of the body 61 for the operator to feel where the desired angular positions of the spool 71 are located. The link 62 may be depressed by axial movement of the outer part of the lever 59 against biasing means to release the oblique end of the lever 62 from a position locking the ball 65 at the desired positions.

It will be apparent from the drawings that having returned the spool 71 to a neutral position from the positions illustrated in FIGS. 4 and 3, movement of the spool 71 in a rotational direction to the left will position the spool 71 to a position such as that illustrated in FIG. 2 with passages 18a and 18b and 19a and 19b, 14a and 14b and 15a and 15b in axial alignment with supply outlets 1 and 2 and offset ports 31 and 30. Operation to the right of this position passages 18a and 18b and 19a and 19b will connect the supply outlet 2 and offset port 30 to a source of pressurised fluid whilst passages 14a and 14b and 15a and 15b connect supply outlet 1 to exhaust manifold 50 via passage 20. It will further be appreciated that similar control movements to those described above are possible for each of the supply outlet port pairs 1 and 2, 3 and 4 and 5 and 6 also offset ports 30 and 31, 32 and 33 and 34 and 35 respectively and individually with the spool 71 in selected rotational positions as defined by operation. In addition to the foregoing, it is possible to connect at least two pairs of supply outlets to the pressurised fluid supply 46 simultaneously by selectively rotating the spool part way between the positions previously identified.

Figure 9A:
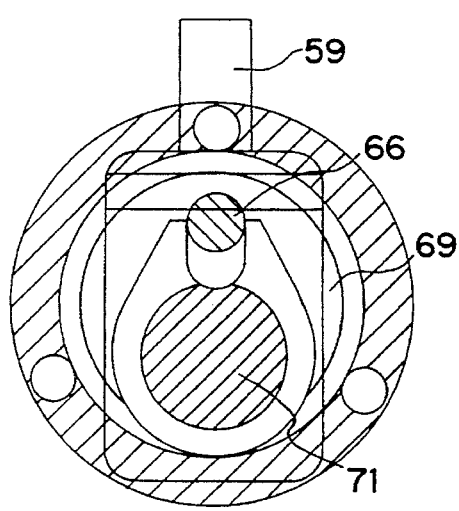
FIGS. 9a, 9b, 9c and 10 are several schematic drawings showing one particular form of manual operative linkages to assist in valve operation, however, several other linkage set-ups could also be used.
Figure 9B:
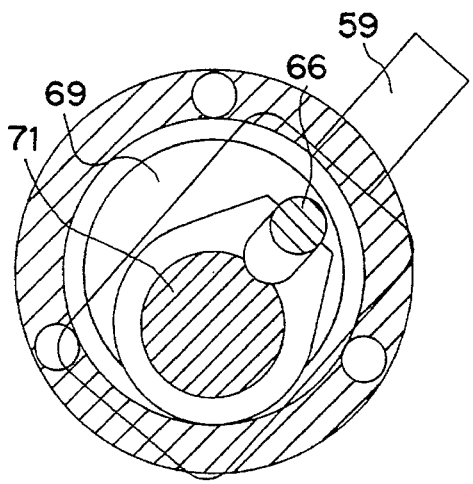
Figure 9C:
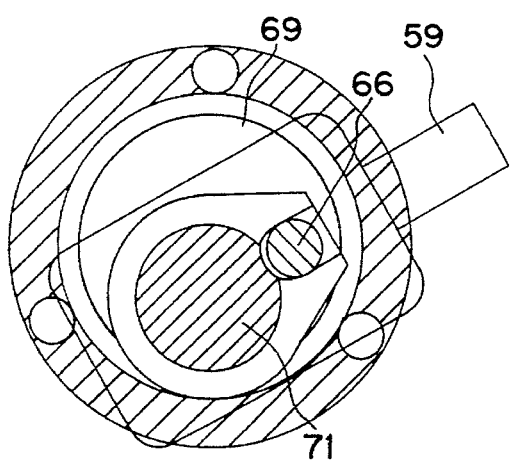
Figure 10:
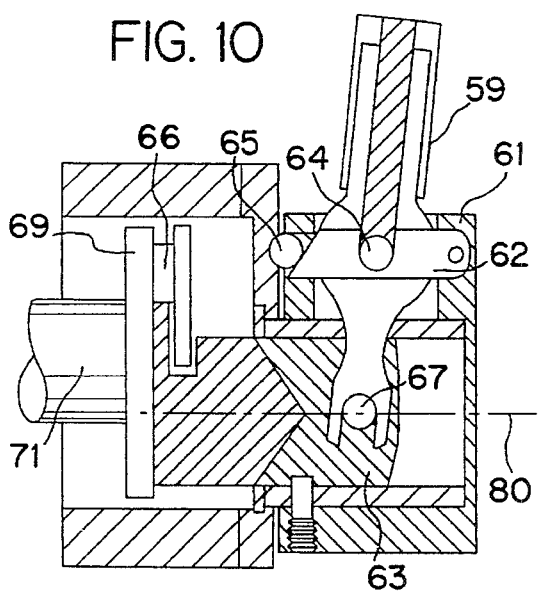

In this manner, as shown in FIG. 6, it is possible for the pressure outlet passages to contact separate adjacent pairs of supply outlets 1 and 2 and 5 and 6 also offset ports 31 and 30 and 35 and 34 as illustrated (refer FIGS. 9a, 9b and 9c). It is apparent that the adjacent outlet 3 and 4 to 1 and 2 and 5 and 6 to 3 and 4 with compatible offset ports are capable of simultaneous operation in the same manner. Therefore enabling the valve to operate either as 1 valve function, 2 valve function, 3 valve function or as a complete mixing valve by selectively operating any 2 valve functions in a simultaneous manner. FIG. 9a showing a lever mechanism retaining valve in line with user vents 1 and 2 held in place by ball 65 and lever 62 while in FIG. 9b the valve is retained in line with user vents 5 and 6. FIG. 9c shows the valve mixing user vents 5 and 6 with user vents 3 and 4. It is highly desirable that the respective ports at the interface of spool 71 and the supply outlets, be round in configuration in the cylinder bore and substantially square or rectangular in configuration within the spool. As without this configuration there could be insufficient open area provided when the valve is operated for use in simultaneous manner. Finally it will be apparent from FIG. 1 of the drawings that the housing can be machined and fitted with a selectable pressure relief valve 48 connecting LP exhaust manifold 47, 50 to HP manifold 49 allowing any HP build up during operation to be channelled back to the supply reservoir. The valve 48 is retained in a longitudinal neutral position as illustrated by a typical valve spring (not shown in the accompanying drawings).

I claim:

1. A manual control valve for controlling flow of pressurized fluid to and from at least two end users of said pressurized fluid, said valve comprising:

a valve body, said valve body having a main bore and at least two fluid flow passage means each leading from respective first port means opening into said main bore and adapted at an outer end for connection to a respective said end user of pressurized fluid;

a distribution spool located within said main bore, said distribution spool being movable within said main bore by manipulation by an operator external to said valve body, said distribution spool including internal distribution passage means having a spool inlet means, for connection to a supply of pressurized fluid and having second port means located at an outer surface of said distribution spool that are cooperable with said first port means in selected positions of said distribution spool within said main bore, at least one of said first and second port means providing a substantially rectangular flow area, said distribution spool being rotationally movable into separate rotational positions, a first one of said rotational positions being such that pressurized fluid is directed from said internal distribution passage means into a respective one of said at least two fluid flow passage means, and in a second one of said rotational positions pressurized fluid is directed simultaneously into two adjacent said fluid flow passage means.

2. The manual control valve according to claim 1 wherein said substantially rectangular flow area is substantially square.

3. The manual control valve according to claim 1 wherein one of said first and second port means provides a substantially rectangular flow area and the other of said first and second port means provides a substantially circular flow area.

4. The manual control valve according to claim 3 wherein said second port means provides a substantially rectangular flow area.

5. The manual control valve according to claim 3 wherein the substantially rectangular flow area is substantially square.

6. The manual control valve according to claim 3 wherein said internal distribution passage means includes a spool inlet means communicable with said valve inlet means regardless of rotational positioning of said spool.

7. The manual control valve according to claim 1 wherein said second port means has a corresponding diametrically opposed offset porting vent leading from said internal distribution passage means to an interface between said valve body and said distribution spool, said offset porting vent being cooperable with third port means in said valve body adapted to communicate said internal distribution passage means with valve exhaust means.

8. The manual control valve according to claim 7 wherein the substantially rectangular flow area is substantially square.

9. The manual control valve according to claim 7 wherein the flow areas have radiused corners.

10. The manual control valve according to claim 1 wherein said valve body includes valve inlet means adapted for connection to the supply of pressurized fluid, said valve inlet means communicating with said main bore whereby said valve inlet means is in communication with the spool inlet means of said internal distribution passage means regardless of rotational positioning of said spool.

11. The manual control valve according to claim 1 wherein the second port means has a substantially rectangular flow area.

12. The manual control valve according to claim 11 wherein each said second port means has a corresponding diametrically opposed offset porting vent leading from said internal distribution passage means to an interface between said valve body and said spool.

13. A manual control valve for controlling flow of pressurized fluid to and from at least two end users of said pressurized fluid, said valve comprising:

a valve body;

valve inlet means adapted for connection to a supply of pressurized fluid whereby pressurized fluid is supplied to said valve body;

valve exhaust means adapted for connection to a reservoir for exhausted fluid;

a distribution spool located within a main bore in said valve body being rotatable and axially movable in said main bore by manipulation of the distribution spool by an operator external to the valve body;

at least two pairs of fluid flow passages arranged in said valve body, each of said fluid flow passages having first port means opening into the main bore of said valve body;

said distribution spool having spool inlet means and further including internal distribution passage means having second port means located at an outer surface of said distribution spool and cooperable with said first port means in selected rotational and axial positions of said distribution spool in said main bore, at least one of said first and second port means providing a substantially rectangular flow area, said internal distribution passage means, in a first axial and rotational position of said distribution spool, being arranged to direct pressurized fluid from said valve inlet means to a first said fluid flow passage of a first one of said at least two pairs of fluid flow passages in said valve body with the other said first pair of fluid flow passages receiving exhaust and communicating same through said internal distribution passage means to said valve exhaust means, said internal distribution passage means, in a second rotation position at said first axial position, being adapted to direct pressurized fluid from said valve inlet means to a first said fluid flow passage of a second one of said at least two pairs of fluid flow passages with the other of said second pair of fluid flow passages receiving exhaust fluid and communicating same through said internal distribution passage means in said distribution spool to said valve exhaust means, and said internal distribution passage means, in at least a third rotational position being adapted to direct pressurized fluid simultaneously to two said fluid flow passages of adjacent pairs of said fluid flow passages, and wherein said distribution spool is movable to a second axial position where pressurized fluid is directed selectably, upon rotation of the distribution spool, into a respective one of said other fluid flow passages, and in another rotational position simultaneously into two adjacent said other fluid flow passages of said pairs of fluid flow passages.

14. The manual control valve according to claim 13 wherein one of said first and second port means provides a substantially rectangular flow area and the other of said first and second port means provides a substantially circular flow area.

15. The manual control valve according to claim 14 wherein said second port means provides a substantially rectangular flow area.

16. The manual control valve according to claim 15 wherein said spool inlet means is disconnected from said inlet means by axial movement of said spool.

17. The manual control valve according to claim 13 wherein each said second port means has a corresponding diametrically opposed offset porting vent leading from the internal distribution passage means to an interface between said valve body and said distribution spool, each said offset porting vent being cooperable with third port means in said valve body adapted to communicate said internal distribution passage means with the valve exhaust means.

18. The manual control valve according to claim 17 wherein said internal distribution passage means includes a pair of axially extending passages within the spool extending outwardly from a central zone of said spool, said axially extending passages each having a centrally inner end which in defined axial positions of said spool is in continuous communication with said valve inlet means regardless of rotational positioning of said spool.

19. The manual control valve according to claim 18, wherein each said axially extending passage includes a non-return valve means arranged to permit flow only towards said second port means.

20. The manual control valve according to claim 13, wherein said internal distribution passage means includes a spool inlet means communicable with said valve inlet means regardless of rotational positioning of said spool.

21. The manual control valve according to claim 20, wherein said spool inlet is located axially between respective said first port means of said at least two pairs of fluid flow passages arranged in the valve body.

22. The manual control valve according to claim 21, wherein pressurized fluid is supplied selectably to one or the other of the pairs of fluid flow passages by axially positioning of said spool.

* * * * *

UNITED STATES PATENT AND TRADEMARK OFFICE
CERTIFICATE OF CORRECTION

PATENT NO. : 5,469,888
DATED : November 28, 1995
INVENTOR(S) : Graeme J. McAlister It is certified that error appears in the above-identified patent and that said Letters Patent is hereby corrected as shown below:

On the Title Page, Item [63], change

"Continuation of Ser. No. 70,406, filed as PCT/AU91/00578, Dec. 12, 1990, abandoned" to --Continuation of Ser. No. 70,406, filed as PCT/AU91/00578, Dec. 12, 1991, abandoned.--

Signed and Sealed this

Fifth Day of March, 1996

Attest:

BRUCE LEHMAN

Attesting Officer

Commissioner of Patents and Trademarks